A. E. CLARK.
BEARING.
APPLICATION FILED SEPT. 24, 1909.
982,250. Patented Jan. 24, 1911.
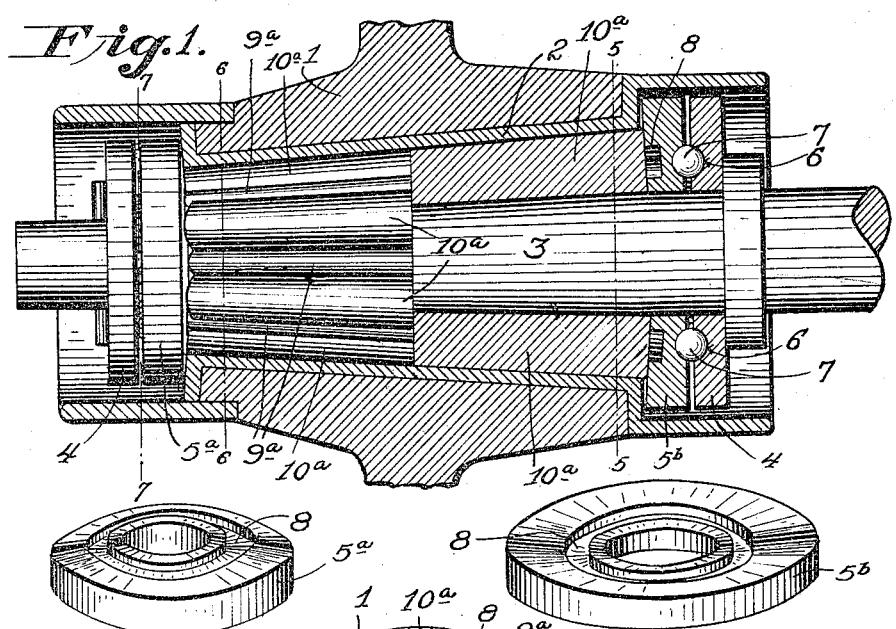
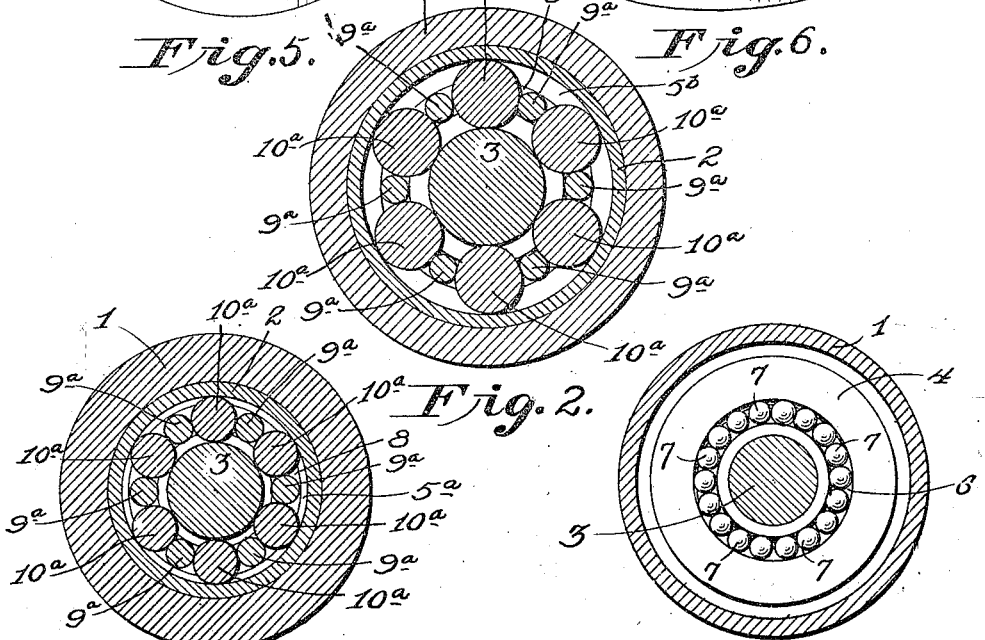
Inventor
Arthur E. Clark

UNITED STATES PATENT OFFICE.

ARTHUR E. CLARK, OF MEMPHIS, MISSOURI.

BEARING.

982,250.	Specification of Letters Patent.	Patented Jan. 24, 1911.

Application filed September 24, 1909. Serial No. 519,340.

*To all whom it may concern:*

Be it known that I, ARTHUR E. CLARK, a citizen of the United States, residing at Memphis, in the county of Scotland and State of Missouri, have invented certain new and useful Improvements in Bearings, of which the following is a specification, reference being had therein to the accompanying drawing.

This invention relates to bearings for shafts and the principal object of the same is to provide a cage bearing which surrounds a shaft and adapted for use in connection with a journal box, the bearing rollers being arranged so that each will be absolutely independent and at all times retained in position to prevent frictional contact of the said shaft with the journal box.

In the practical application of the invention it is contemplated forming the improved bearing of two pairs of end plates the members of each pair of plates having bearing balls interposed between them, the inner member of each pair of end plates having its inner face provided with an annular groove, said plates being adapted to be fitted over a shaft serving as end supports for a plurality of cylindrical rollers which are retained in spaced surrounding relation to the said shaft, said rollers being adapted to retain in spaced relation larger cylindrical rollers which are interposed between the said shaft and the journal box.

It will be understood, of course, that in carrying out the objects of the invention generally stated above, the essential features thereof are necessarily susceptible of changes in details and structural arrangements, certain preferred and practical embodiments of which are shown in the accompanying drawings, wherein:—

Figure 1 is a view showing the bearing adapted for a tapering journal box. Fig. 2 is a vertical transverse sectional view taken on the line 5—5, of Fig. 1. Fig. 3 is a similar view taken on the line 6—6, Fig. 1. Fig. 4 is another similar view taken on the line 7—7, Fig. 1. Fig. 5 is a detail perspective view of the inner member of the outer pair of end plates. Fig. 6 is a similar view of the inner member of the inner pair of end plates.

In the accompanying drawing, the improved bearing has been shown applied to the hub and axle of a vehicle wheel, but it will, of course, be readily understood that the same is but one of the many uses of the same.

Referring to said drawings by numerals, 1 designates a hub, 2 the usual boxing thereof, and 3 the axle spindle.

The improved bearing forming the subject-matter of this invention is composed primarily of end plates loosely fitted around the axle and arranged in pairs, the members 4 and 5ª and 5ᵇ of which are complementally grooved on their faces to provide an annular ball race 6 for the antifriction balls 7. The inner members 5ª and 5ᵇ of each pair of end plates are preferably thicker than the outer member 4 and are each provided on its inner face with an annular groove 8 for the ends of a plurality of elongated tapering rollers 9ª which are held in spaced surrounding relation to said axle, spindle and the hub box 3 by said groove 8. Each of these members 5ª and 5ᵇ is respectively concave and convex on its inner face so that it will conform to the angle of the ends of the large tapering rollers 10ª. A plurality of cylindrical rollers 10ª which are larger in diameter than the tapering rollers 9ª are fitted between the inner plates 5 and rest in contact with the hub box and the axle spindle, each tapering roller 10ª being spaced from the adjacent roller by the tapering rollers 9, the arrangement being such that each tapering roller 10ª may rotate independently.

It will be seen from the foregoing that all parts of the improved bearing may be readily separated, as the same are retained in operative relation by the parts of the hub and spindle to which they are applied.

As will be understood, the tapering rollers 10ª are the main antifriction tapering rollers of the bearing and they are loose between the inner plates 5ª and 5ᵇ and are retained in spaced antifriction relation by the smaller interposed tapering rollers 9ª which are rotatably supported in the annular groove 8. It will also be understood that the end plates 4—5ª and 5ᵇ are loose on the axle spindle. This described manner of mounting the roller bearings and also the plates, permits the members of the bearing to be entirely independent, so that the bearing will still perform its friction overcoming functions in the event of any of the parts thereof becoming jammed or clogged.

What I claim as my invention is:—

A bearing for shafts, comprising a shaft, pairs of plates loose thereon, each pair of plates having an annular groove in their adjacent faces, balls in said grooves, one of said plates being convex and the other concave on the adjacent faces of said plates, the inner plate of each of said pairs of plates having an annular groove on its inner face, tapering bearing rollers located longitudinally about said shaft, and spacing tapering rollers located longitudinally about said shaft alternating with the tapering bearing rollers and having their ends loosely mounted in the inner annular groove of the inner loose plate.

In testimony whereof I hereunto affix my signature in presence of two witnesses.

ARTHUR E. CLARK.

Witnesses:
JOHN H. WATKINS,
J. E. LUTHER.